Figure 1:
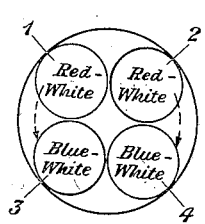

May 1, 1928.

A. L. RICHEY 1,667,824

MULTIPLE UNIT CABLE

Filed Dec. 5, 1925

INVENTOR
A. L. Richey
BY
ATTORNEY

Patented May 1, 1928.

1,667,824

UNITED STATES PATENT OFFICE.

ARCHIE L. RICHEY, OF BOONTON, NEW JERSEY, ASSIGNOR TO AMERICAN TELEPHONE AND TELEGRAPH COMPANY, A CORPORATION OF NEW YORK.

MULTIPLE-UNIT CABLE.

Application filed December 5, 1925. Serial No. 73,434.

This invention relates to cables, and more particularly to so-called "multiple unit" cables, in which different sets of pairs of individually insulated conductors are grouped separately and distinctively marked.

The "multiple unit" cable is described in the United States patent applications of L. S. Ford, numbered 677,873 and 707,528, filed November 30, 1923 and April 18, 1924, respectively. The cable is formed of a number of groups of pairs of individually insulated conductors, the pairs of each group being stranded together and the groups either stranded or otherwise laid out to form the cable. In such a cable, practical considerations, notably that of splicing, render it desirable that the conductor pairs be divided into groups, any one distinguishable from the others, and Ford groups together as a separate unit in the cable all the conductor pairs of like marking. For instance, there will be a cable comprising four separate groups of conductor pairs of which one group may have one conductor of each pair covered with red insulating material and the other with white insulating material. Another group may be composed of blue and white pairs, etc. If the most obvious arrangement of these group units is made, the groups will appear in a clockwise order at one end of the cable or cable section and in a counter-clockwise order at the other end. It follows that if difficulty in splicing is to be avoided, a clockwise appearing end must be spliced to a counter-clockwise appearing end. This requirement, of course, is burdensome, since the cable sections to be spliced must be placed in a certain way.

The object of applicant's invention is to provide a cable having such an arrangement of color groups that the necessity of placng the cable in a particular way for splicing is obviated. In other words, applicant aims to provide a cable with which either end of a section may be spliced to either end of another section without difficulty.

In general, applicant, in attaining this object, divides each of a plurality of sets of like pairs equally and so groups the divisions that either end of a section of the cable may be spliced to either end of another section, any division of a set of pairs being in such position that it is readily spliced with a division of the same set. More particularly, the divisions of the various sets of pairs are so arranged in the cable that several series of pair groups are formed, a series and the series corresponding to it each including one division of a divided set, and, when the cable or cable section is viewed from either end, the groups of one series are in substantially clockwise order and the groups of the corresponding series in substantially counter-clockwise order.

Applicant's arrangement will be more clearly understood when the following detailed description is read with reference to the accompanying drawing, of which the five figures show schematically the arrangement of color groups in five different cables.

The cable of which the arrangement is shown in Fig. 1 comprises four groups of pairs of individual insulated conductors, the groups being equal in size. This cable may comprise 100 pairs in groups of 25 pairs each, for instance, or, for further example, 200 pairs in groups of 50 pairs each. The equal groups 1 and 2 are composed of red-white pairs, that is, pairs having one conductor insulated with a red covering and the other insulated with a white covering. The groups 3 and 4 are made up of blue-white pairs. Given the arrangement of these color groups shown in Fig. 1, the cable or cable section may be viewed from either end, and the color groups will appear in two series, one consisting of the red-white group 2 and the blue-white group 4, and the other consisting of the red-white group 1 and the blue-white group 3. Considering the red-white group as the starting point in each series of Fig. 1, it is seen that in one series the arrangement of color groups is 2 and 4 in substantially clockwise order and in the other series the order of groups is 1 and 3 in substantially counter-clockwise order, as indicated by the broken line arrows, and, of course, a view of the cable from the other end will show groups 1 and 3 in clockwise order and groups 2 and 4 in counter-clockwise order. It is obvious that this arrangement renders splicing simple without the necessity of giving consideration to the placing of the ends of the cable or cable section.

Figure 2:
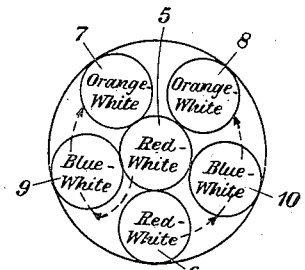

The cable shown in Fig. 2 is made up of six groups of 25 pairs each, for instance. In this figure the colors of the sets of conductor pairs are red-white, orange-white and blue-white, the red-white pairs being equally divided and formed into the groups 5 and 6, the orange-white pairs being divided and formed into the groups 7 and 8, and the blue-white pairs being divided and formed into the groups 9 and 10. In this case, one red-white group 5 is placed in the center of the cable, and the remaining five groups are placed about this central group in the order shown. There are two series of color groups, each comprising one red-white group, one orange-white group and one blue-white group. The one series, made up of the groups 5, 9 and 7, has a substantially clockwise order, and the other series, made up of the groups 6, 10 and 8, has a counter-clockwise order, these orders being reversed at the other end of the cable.

Figure 3:
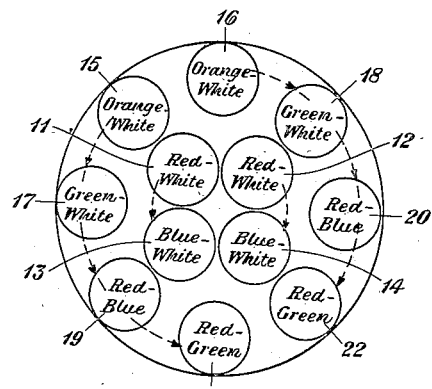

The cable shown in Fig. 3 has 12 separate color groups and may be composed of 300 pairs in groups of 25 pairs each, 600 pairs in groups of 50 pairs each, or 1,200 pairs in groups of 100 pairs each. There are six sets of conductor pairs, each distinguishable from the others by the color marking. One set, of red-white, is divided equally into the units 11 and 12. The other sets are colored and equally divided as follows: blue-white into the groups 13 and 14, orange-white into the groups 15 and 16, green-white into the groups 17 and 18, red-blue into the groups 19 and 20, and red-green into the groups 21 and 22. In this case it will be seen that there are four series of color groups, two of these series corresponding to the other two. The first pair of series comprise the color groups 12 and 14 and 11 and 13, the first having a red-white group and a blue-white group in substantially clockwise order, and the second having a red-white group and a blue-white group in substantially counter-clockwise order. Likewise the groups 16, 18, 20 and 22 and 15, 17, 19 and 21 form two corresponding series, the first having orange-white, green-white, red-blue and red-green groups in clockwise order, and the other having like groups in counter-clockwise order. If the cable is viewed from the other end, the order in each of the four series is reversed.

Figure 4:
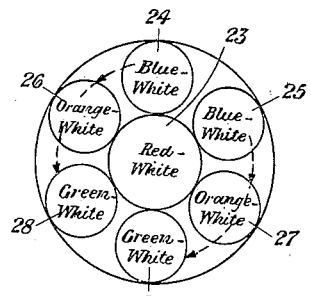

The cable of Fig. 4 may have one group of 50 pairs and six groups of 25 pairs, or one group of 100 pairs and six groups of 50 pairs, the large group being placed at the center of the cable, and the remaining six groups being disposed about this central group. In this case all the red-white pairs are grouped in a single unit 23, this being the large unit at the center of the cable. The remaining color sets, blue-white, orange-white and green-white, are each divided equally into two separate groups 24 and 25, 26 and 27 and 28 and 29, respectively. The groups 25, 27 and 29 form one series giving a clockwise arrangement of blue-white, orange-white and green-white pairs. Correspondingly, the groups 24, 26 and 28 are arranged in counter-clockwise order. At the other end, of course, these orders appear reversed.

Figure 5:
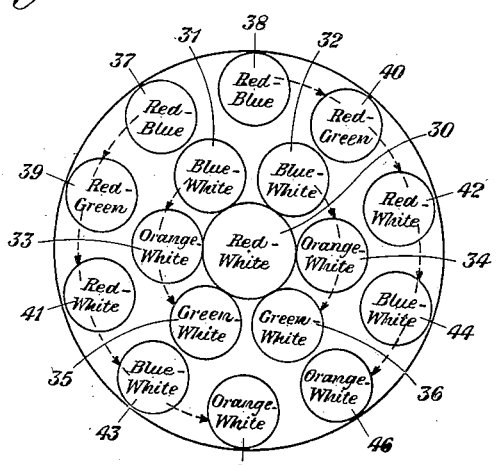

The cable of Fig. 5 is larger than those described above and may have 900 pairs, for instance, arranged in one group of 100 pairs and sixteen groups of 50 pairs each. The large group 30, red-white, is placed in the center of the cable. About this group there are formed four series of smaller groups. The first series comprises the groups 32, 34 and 36 and gives an arrangement blue-white, orange-white and green-white in clockwise order, corresponding to the second series 31, 33 and 35 having groups of like colors in counter-clockwise order. Similarly the groups 38, 40, 42, 44 and 46 give the clockwise order of red-blue, red-green, red-white, blue-white and orange-white and correspond to the series 37, 39, 41, 43 and 45 giving groups of corresponding colors in counter-clockwise order. Again, the arrangement at the other end of the cable is the reverse, as to clockwise and counter-clockwise order, of that shown in the drawing.

While applicant's invention has, for the purpose of illustration, been disclosed in certain specific embodiments which are deemed desirable, it is to be understood that the scope of the invention is not limited thereby but is defined by the appended claims.

What is claimed is:

1. A cable for the transmission of electric current, comprising a plurality of pairs of individually insulated conductors, said pairs being of such appearance that they form several sets of pairs each distinguishable from the other sets, the pairs being so grouped that a plurality of sets of pairs are each divided equally, and the divisions of the several sets so arranged that a plurality of series of pair groups are formed such that no series includes two groups indistinguishable from each other, and, the cable being viewed from either end, the groups of one series are in substantially clockwise order and the groups of the corresponding series in substantially counter-clockwise order.

2. A cable for the transmission of electric current, comprising a plurality of pairs of individually insulated conductors, said pairs being of such appearance that they form several sets of pairs each distinguishable from the other sets, the pairs being so grouped that a plurality of sets of pairs are each divided into halves, and the halves of the several sets are so arranged that a plurality of series of pair groups are formed, each series including only one half of a divided set, and, the cable being viewed from either end, the groups of one series are in substantially clockwise order and the groups of the corresponding series in substantially counter-clockwise order.

3. In a cable for the transmission of electric current, comprising a plurality of pairs of individually insulated conductors, said pairs being of such appearance that they form several sets of pairs each distinguishable from the other sets, a grouping of the pairs of a plurality of sets such that each of said sets is divided equally, and the divisions of the several sets are so arranged that a plurality of series of pair groups are formed such that no series includes two groups indistinguishable from each other, and, the cable being viewed from either end, the groups of one series are in substantially clockwise order and the groups of the corresponding series in substantially counter-clockwise order.

4. In a cable for the transmission of electric current, comprising a plurality of pairs of individually insulated conductors, said pairs being of such appearance that they form several sets of pairs each distinguishable from the other sets, a grouping of the pairs of a plurality of sets such that each of said sets is divided into halves, and the halves of the several sets are so arranged that a plurality of series of pair groups are formed, each series including only one half of a divided set, and, the cable being viewed from either end, the groups of one series are in substantially clockwise order and the groups of the corresponding series in substantially counter-clockwise order.

5. A cable for the transmission of electric current, comprising a plurality of pairs of individually insulated conductors, said pairs being of such appearance that they form several sets of pairs each distinguishable from the other sets, the pairs of a plurality of sets being so grouped that each of said sets is separated into equal divisions, and the cable being viewed from either end, one division of each set has a position in a series of groups corresponding to that of another division of the same set in another series, the groups of the one series being disposed in substantially clockwise order and the groups of the other series in substantially counter-clockwise order, and no series including two groups indistinguishable from each other.

6. A cable for the transmission of electric current, comprising a plurality of pairs of individually insulated conductors, said pairs being of such appearance that they form several sets of pairs each distinguishable from the other sets, the pairs of a plurality of series being so grouped that each of said sets is separated into halves, and, the cable being viewed from either end, one half of each set has a position in a series of groups corresponding to that of the other half in another series, the groups of the one series being disposed in substantially clockwise order and the groups of the other series in substantially counter-clockwise order.

7. In a cable for the transmission of electric current, comprising a plurality of pairs of individually insulated conductors, said pairs being of such appearance that they form several sets of pairs each distinguishable from the other sets, a grouping of the pairs such that a plurality of sets of pairs are each separated into equal divisions, and, the cable being viewed from either end, one division of each set has a position in a series of groups corresponding to that of another division of the same set in another series, the groups of the one series being disposed in substantially clockwise order and the groups of the other series in substantially counter-clockwise order, and no series including two groups indistinguishable from each other.

8. In a cable for the transmission of electric current, comprising a plurality of pairs of individually insulated conductors, said pairs being of such appearance that they form several sets of pairs each distinguishable from the other sets, a grouping of the pairs such that a plurality of sets of pairs are each separated into halves, and, the cable being viewed from either end, one half of each set has a position in a series of groups corresponding to that of the other half in another series, the groups of the one series being disposed in substantially clockwise order and the groups of the other series in substantially counter-clockwise order.

9. A cable for the transmission of electric current, comprising a plurality of pairs of individually insulated conductors, said pairs being of such appearance that they form several sets of pairs each distinguishable from the other sets, one of said sets of pairs being grouped as a unit at the center of the cable, the remaining sets of pairs being each separated into equal divisions, and the pairs thereof being so grouped that, the cable being viewed from either end, one division of each set has a position in a series of groups corresponding to that of another division of the same set in another series, the groups of the one series being disposed in clockwise order and the groups of the other series in counter-clockwise order, and no series including two groups indistinguishable from each other.

10. A cable for the transmission of electric current, comprising a plurality of pairs of individually insulated conductors, said pairs being of such appearance that they form several sets of pairs each distinguishable from the other sets, one of said sets of pairs being grouped as a unit at the center of the cable, the remaining sets of pairs being divided into halves, and the pairs thereof being so grouped that, the cable being viewed from either end, one half of each set has a position in a series of groups corresponding to that of the other half of the same set in another series, the groups of the one series being disposed in clockwise order and the groups of the other series in counter-clockwise order.

11. In a cable for the transmission of electric current, comprising a plurality of pairs of individually insulated conductors, said pairs being of such appearance that they form several sets of pairs each distinguishable from the other sets, an arrangement of the pairs such that one set is grouped as a unit at the center of the cable, the remaining sets are each separated into equal divisions, and the pairs of the divided sets are so grouped that, the cable being viewed from either end, one division of each set has a position in a series of groups corresponding to that of another division of the same set in another series, the groups of the one series being disposed in clockwise order and the groups of the other series in counter-clockwise order, and no series including two groups indistinguishable from each other.

12. In a cable for the transmission of electric current, comprising a plurality of pairs of individually insulated conductors, said pairs being of such appearance that they form several sets of pairs each distinguishable from the other sets, an arrangement of the pairs such that one set is grouped as a unit at the center of the cable, the remaining sets are each divided into halves, and the pairs of the divided sets are so grouped that, the cable being viewed from either end, one half of each set has a position in a series of groups corresponding to that of the other half of the same set in another series, the groups of the one series being disposed in clockwise order and the groups of the other series in counter-clockwise order.

13. The method of forming a cable of a plurality of pairs of individually insulated conuctors, said pairs being of such appearance that they form several sets of pairs each distinguishable from the other sets, which consists in equally dividing a plurality of sets of pairs, placing the pairs of each division in a group and so arranging the pair groups that a plurality of series of pair groups are formed, each series including one division of a divided set, and, the cable being viewed from either end, the groups of one series are in substantially clockwise order and the groups of the corresponding series are in substantially counter-clockwise order.

14. The method of forming a cable of a plurality of pairs of individually insulated conductors which consists in arranging the pairs to form a plurality of pair groups, distinguishing groups from other groups by suitable marking, and so arranging the groups that a plurality of series of groups are formed, no series containing two groups indistinguishable from each other and each series corresponding to another series, the groups of one series being arranged in substantially clockwise order and the groups of the corresponding series in substantially counter-clockwise order when the cable is viewed from either end.

In testimony whereof, I have signed my name to this specification this 4th day of December, 1925.

ARCHIE L. RICHEY.